(12) United States Patent
Mueller et al.

(10) Patent No.: US 9,669,697 B2
(45) Date of Patent: Jun. 6, 2017

(54) DRIVE TRAIN FOR A HYBRID MOTOR VEHICLE

(71) Applicant: Dr. Ing. h.c. F. Porsche Aktiengesellschaft, Stuttgart (DE)

(72) Inventors: Stephan Mueller, Leonberg (DE); Falk Heilfort, Eberdingen (DE); Philipp Schultis, Stuttgart (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 42 days.

(21) Appl. No.: 14/787,554

(22) PCT Filed: Jan. 31, 2014

(86) PCT No.: PCT/EP2014/000261
§ 371 (c)(1),
(2) Date: Oct. 28, 2015

(87) PCT Pub. No.: WO2014/183813
PCT Pub. Date: Nov. 20, 2014

(65) Prior Publication Data
US 2016/0082821 A1   Mar. 24, 2016

(30) Foreign Application Priority Data

May 16, 2013   (DE) .................. 10 2013 105 026

(51) Int. Cl.
*B60K 6/365* (2007.10)
*B60K 6/26* (2007.10)
(Continued)

(52) U.S. Cl.
CPC ............... *B60K 6/26* (2013.01); *B60K 6/365* (2013.01); *B60K 6/48* (2013.01);
(Continued)

(58) Field of Classification Search
CPC .. B60K 6/365; B60K 6/48; B60K 6/26; F16H 3/006
See application file for complete search history.

(56) References Cited

U.S. PATENT DOCUMENTS 3,481,220 A * 12/1969 Kaptur .................... F16H 3/005
475/13
5,856,709 A * 1/1999 Ibaraki ..................... B60K 6/36
180/165
(Continued)

FOREIGN PATENT DOCUMENTS

AT    102013100883 A1 * 8/2013 ............. B60K 6/365
DE    199 50 567           5/2000
(Continued)

OTHER PUBLICATIONS

International Search Report.

*Primary Examiner* — J. Allen Shriver, II
*Assistant Examiner* — Steve Clemmons
(74) *Attorney, Agent, or Firm* — Gerald E. Hespos; Michael J. Porco; Matthew T. Hespos

(57) ABSTRACT

The invention relates to a drive train (10) for a hybrid vehicle comprising an internal combustion engine (12) having a motor shaft (18) for providing a torque for driving the hybrid vehicle, and comprising an electric machine (30) for providing a torque for driving the hybrid vehicle, wherein the electric machine (30), in particular for starting of the internal combustion engine (12), can be coupled to the motor shaft (18) by means of a selectively engageable planetary gear unit (38) for providing at least two different transmission ratios, wherein the electric machine (30) can be coupled by means of a transmission gearing (48), in particular a sun gear system having a transmission ratio different from 1.0, (Continued)

having an intermediate shaft (46) for introducing the torque into the planetary gear unit (38).

10 Claims, 1 Drawing Sheet

(51) Int. Cl.
    *B60K 6/48*         (2007.10)
    *F16H 3/00*         (2006.01)
    *B60K 25/00*       (2006.01)
    *F16H 3/093*      (2006.01)

(52) U.S. Cl.
    CPC   *B60K 2006/268* (2013.01); *B60K 2006/4808* (2013.01); *B60K 2006/4825* (2013.01); *B60K 2006/4841* (2013.01); *B60K 2025/005* (2013.01); *F16H 3/006* (2013.01); *F16H 2003/0931* (2013.01); *F16H 2200/006* (2013.01); *Y02T 10/626* (2013.01); *Y02T 10/6221* (2013.01); *Y02T 10/6252* (2013.01); *Y10S 903/906* (2013.01); *Y10S 903/91* (2013.01)

(56) References Cited

U.S. PATENT DOCUMENTS

| | | | | |
|---|---|---|---|---|
| 6,048,288 | A * | 4/2000 | Tsujii | B60H 1/3222 180/65.25 |
| 6,317,665 | B1 | 11/2001 | Tabata et al. | |
| 6,464,028 | B1 * | 10/2002 | Imani | B60K 6/26 180/65.25 |
| 6,695,082 | B2 * | 2/2004 | Bitsche | B60K 6/36 123/179.28 |
| 6,811,508 | B2 * | 11/2004 | Tumback | B60K 6/445 475/5 |
| 8,347,992 | B2 * | 1/2013 | Gecim | B60K 6/485 180/65.265 |
| 8,479,603 | B2 * | 7/2013 | Ikegami | B60K 6/48 74/330 |
| 8,494,712 | B2 * | 7/2013 | Vasilescu | B60H 1/3222 180/65.27 |
| 8,573,340 | B2 * | 11/2013 | Tarasinski | B60K 6/26 180/65.22 |
| 8,622,861 | B2 * | 1/2014 | Nett | B60K 6/442 475/5 |
| 8,690,723 | B2 * | 4/2014 | Dilzer | F02N 15/046 475/318 |
| 9,090,155 | B2 * | 7/2015 | Lee | B60K 6/387 |
| 9,222,563 | B2 * | 12/2015 | Kaltenbach | B60K 6/387 |
| 2002/0033059 | A1 | 3/2002 | Pels et al. | |
| 2003/0217617 | A1 | 11/2003 | Sakamoto et al. | |
| 2005/0139035 | A1 * | 6/2005 | Lee | B60K 6/36 74/661 |
| 2010/0216584 | A1 | 8/2010 | Lutoslawski | |
| 2011/0113907 | A1 | 5/2011 | Pesola et al. | |
| 2011/0178660 | A1 * | 7/2011 | Tarasinski | B60K 6/48 701/22 |
| 2011/0300985 | A1 | 12/2011 | Kunze et al. | |
| 2011/0312460 | A1 | 12/2011 | Nett et al. | |
| 2012/0089283 | A1 * | 4/2012 | Rauner | B60W 30/18027 701/22 |
| 2012/0220403 | A1 | 8/2012 | Reichert et al. | |

FOREIGN PATENT DOCUMENTS

| | | | | |
|---|---|---|---|---|
| DE | 19960621 | A1 * | 6/2001 | ............ B60K 6/36 |
| DE | 101 33 695 | | 3/2002 | |
| DE | 10 2004 062 530 | | 10/2005 | |
| DE | 102010019047 | A1 * | 11/2011 | ............ F02N 15/00 |
| DE | 10 2010 023 080 | | 1/2012 | |
| DE | 102010017760 | A1 * | 1/2012 | ............ B60K 6/36 |
| DE | 102011077590 | A1 * | 12/2012 | ............ B60K 6/52 |
| EP | 2 008 854 | | 12/2008 | |
| EP | 2 322 371 | | 5/2011 | |
| WO | 2010/063735 | | 6/2010 | |

* cited by examiner

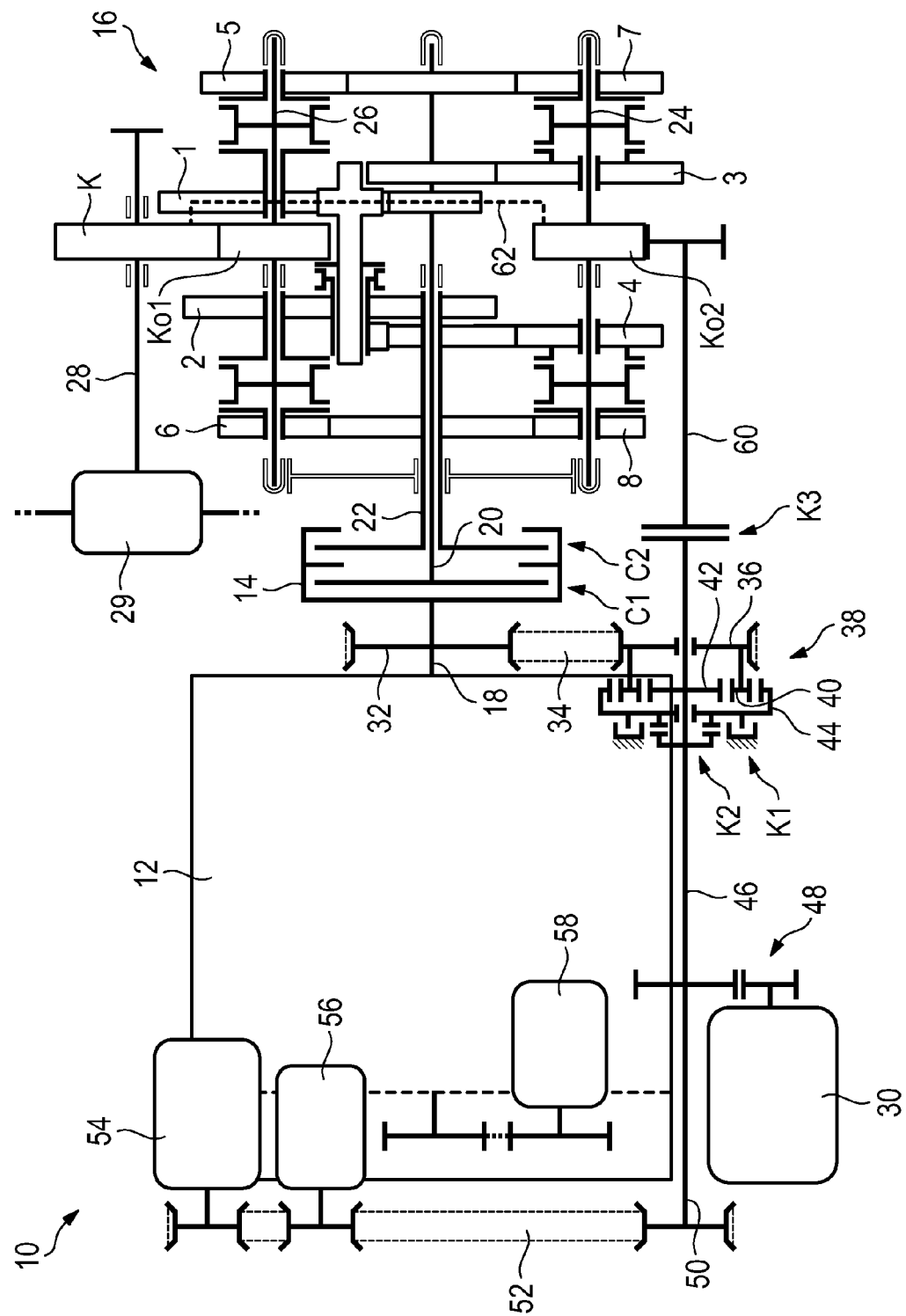

DRIVE TRAIN FOR A HYBRID MOTOR VEHICLE

BACKGROUND

1. Field of the Invention

The invention relates to a drive train for a hybrid motor vehicle, with the aid of which a torque produced by an internal combustion engine and/or by an electric machine can be transmitted.

2. Description of the Related Art

US 2010/0216584 A1 discloses a drive train for a hybrid motor vehicle, in which an electric machine has a rotor, which is designed as an annulus of a planetary gearset. The annulus is coupled via planet wheels supported by a planet carrier to a sun wheel, which is connected for conjoint rotation to a transmission output shaft of a motor vehicle transmission to enable the hybrid motor vehicle to be driven electrically. The planet carrier is connected to a shaft connected via gearing to an engine shaft of an internal combustion engine in order to be able to start the internal combustion engine with the aid of the electric machine.

There is a constant need to reduce the space required to install a drive train.

It is the object of the invention to indicate measures which allow a drive train with a small installation space requirement.

SUMMARY

According to the invention, a drive train for a hybrid motor vehicle is provided, said drive train having an internal combustion engine, which has an engine shaft, for supplying a torque to drive the hybrid motor vehicle, and an electric machine for supplying a torque to drive the hybrid motor vehicle, wherein the electric machine can be coupled to the engine shaft, in particular in order to start the internal combustion engine, via a shiftable planetary gearset for supplying at least two different transmission ratios, wherein the electric machine can be coupled, via a speed-transforming gear, in particular a spur wheel gear, having a transmission ratio differing from 1.0, to an intermediate shaft in order to introduce the torque into the planetary gearset.

The speed-transforming gear can be positioned so as to be spaced apart from the planetary gearset by a defined distance in an axial direction, i.e. substantially parallel to an axis of rotation of the engine shaft of the internal combustion engine, depending on the design of the intermediate shaft. As a result, the electric machine can be arranged adjacent to the planetary gearset in an axial direction, ensuring that the electric machine does not have to fit radially around the planetary gearset. It is thereby possible to reduce the extent of the electric machine in a radial direction, thus allowing the installation space requirement for the drive train to be reduced. The planetary gearset and a link to the engine shaft which follows the planetary gearset, e.g. via a toothed chain or a roller chain, provide a transmission ratio which leads, in particular, to a reduction in the speed of the electric machine, allowing a correspondingly high torque to be introduced in order to start the internal combustion engine. To cold-start the internal combustion engine, a transmission ratio of 1:3, for example, can be provided for this purpose by the planetary gearset. Since the electric machine does not act directly on the planetary gearset but is first coupled to the intermediate shaft via the speed-transforming gear, an additional transmission ratio can be achieved with the aid of the speed-transforming gear, leading, in particular, to an additional reduction in the speed of the electric machine. A correspondingly high torque can thereby be introduced at a lower speed into the planetary gearset. As a result, the planetary gearset can be designed for lower speeds and hence for lower loads due to centrifugal forces, thereby enabling the design requirements on the planetary gearset to be reduced and production costs to be lowered. Through the arrangement of the electric machine at a distance from the planetary gearset, as made possible by the intermediate shaft, and through the additional reduction in the speed of the electric machine that can be achieved with the speed-transforming gear, the dimensions of the electric machine can be reduced, thereby allowing a drive train with a small installation space requirement.

The engine shaft of the internal combustion engine can be a crankshaft or a cardan shaft, for example, which can be driven directly or indirectly by the combustion of a fuel mixture in the internal combustion engine. As functional elements, the planetary gearset has, in particular, a sun wheel, an annulus, at least one planet wheel meshing with the sun wheel and with the annulus, and a planet carrier THAT supports the at least one planet wheel in a rotatable manner. The transmission ratio of the planetary gearset can be modified, in particular, by braking and/or rotationally coupling one of the functional elements of the planetary gearset with respect to another functional element and/or with respect to a fixed component, e.g. a housing, or canceling said braking and/or coupling. By way of example, the speed-transforming gear has a first wheel, in particular gearwheel or belt pulley, connected for conjoint rotation to an electric motor shaft of the electric machine, and a second wheel, in particular gearwheel or belt pulley, which is connected for conjoint rotation to the intermediate shaft, wherein the first wheel and the second wheel have different effective diameters in order to provide a desired transmission ratio. By using a spur wheel gear as a speed-transforming gear, a fixed transmission ratio can be specified with a small installation space requirement. However, it is also possible to provide a variable transmission ratio for the speed-transforming gear, e.g. with the aid of a continuously variable flexible transmission (CVT). The electric machine can be in permanent mesh and connected to the intermediate shaft via the speed-transforming gear.

The electric machine can be coupled to at least one auxiliary unit via an auxiliary shaft, which is spaced apart radially from the engine shaft and can be coupled to the intermediate shaft, wherein, in particular, the auxiliary shaft is spaced apart radially from the internal combustion engine. This makes it possible to drive auxiliary units, e.g. an oil pump, water pump, air conditioning compressor of an air conditioning system or the like, mechanically, in particular via a belt drive, with the aid of the electric machine even when the internal combustion engine is switched off. In addition, the internal combustion engine can have a torque output, e.g. a belt pulley or chain wheel connected to the engine shaft, in order to drive the auxiliary units mechanically via the same mechanical link as that also used by the auxiliary shaft. In particular, the auxiliary units that can be driven via the auxiliary shaft can be positioned on a side of the internal combustion engine remote from the motor vehicle transmission, while coupling of the electric machine to the engine shaft via the planetary gearset can be provided on the same side as the motor vehicle transmission. The axial spacing between the link to the engine shaft and a link to the auxiliary units made, in particular, via the belt drive can easily be bridged by the auxiliary shaft and the intermediate shaft, preferably to the outside of the internal combustion engine.

The electric machine may be positioned at an axial level of the internal combustion engine and spaced apart radially from the internal combustion engine, wherein, in particular, the intermediate shaft and/or the auxiliary shaft is/are positioned between the internal combustion engine and the electric machine in a radial direction. As a result, the electric machine can be positioned adjacent to the internal combustion engine in a radial direction, making it unnecessary to provide axial installation space for the electric machine between the internal combustion engine and the motor vehicle transmission. It is thereby possible to keep the axial installation space requirement for the drive train small, ideally with a neutral effect on length.

The planetary gearset may have at least one clutch for changing a transmission ratio, wherein, in particular, a first clutch can brake an annulus of the planetary gearset so that it is fixed against relative rotation, and/or a second clutch can couple the annulus of the planetary gearset for conjoint rotation to the intermediate shaft, wherein the planetary gearset preferably has a sun wheel connected for conjoint rotation to the intermediate shaft. The first clutch and/or the second clutch are, in particular, capable of being power-shifted and/or electronically controlled, thus allowing the transmission ratio to be changed, preferably at least in part continuously, with a slipping clutch in continuous operation. With the first clutch open and the second clutch closed, this enables the planetary gearset to revolve as a block, giving a transmission ratio of 1.0. If the first clutch is closed and the second clutch is opened, a transmission ratio that differs from 1.0 is obtained. If both the first clutch and the second clutch are open, torque transfer between the electric machine and the engine shaft can be interrupted.

The engine shaft can be coupled to a motor vehicle transmission via a transmission clutch in order to shift transmission gears, wherein the motor vehicle transmission has at least one transmission input shaft for introducing a torque, one transmission output shaft for outputting a transformed torque, and at least one selector shaft for transmitting the torque from the transmission input shaft to the transmission output shaft, wherein the electric machine can be coupled to the selector shaft, bypassing the transmission input shaft, in order to introduce a torque into the selector shaft, or to the transmission output shaft in order to introduce a torque into the transmission output shaft. In particular, the motor vehicle transmission can be designed as a dual clutch transmission for shifting transmission gears substantially without an interruption in tractive effort. In particular, the transmission clutch is designed as a dual clutch. During purely electric operation of the hybrid motor vehicle, the torque provided by the electric machine can be introduced directly into the motor vehicle transmission without the power first having to flow via the transmission clutch and the transmission input shaft before the torque reaches the motor vehicle transmission. This optimizes the efficiency chain and supplies the conditions for high efficiency. In particular, a transmission clutch for coupling the engine shaft to the at least one transmission input shaft is opened to interrupt a torque input into the transmission input shaft from outside the motor vehicle transmission. The internal combustion engine may be decoupled from the motor vehicle transmission for purely electric operation of the hybrid motor vehicle, and a torque produced by the electric machine is then introduced into the motor vehicle transmission via the selector shaft of the motor vehicle transmission, bypassing the at least one transmission input shaft and the transmission clutch. This makes it possible, in particular, to avoid a drag torque caused by the engine shaft and the transmission clutch in the electric driving mode.

In particular, the electric machine can be coupled to the selector shaft or to the transmission output shaft via a spur wheel gear pair, which acts directly on the selector shaft or on the transmission output shaft, and/or via a flexible transmission, which acts directly on the selector shaft or on the transmission output shaft. Intermediate components can thereby be avoided. Particularly if the torque of the electric machine is introduced into the selector shaft, the torque is transmitted only indirectly to the transmission output shaft, optionally via the transmission input shaft, thus making it possible to achieve an additional transmission ratio between the electric machine and the transmission output shaft, depending on the transmission gears selected.

The motor vehicle transmission has a first selector shaft, which can be coupled to the electric machine, and a second selector shaft, which is coupled to the output shaft, wherein the torque that can be introduced into the motor vehicle transmission by the electric machine flows to the output shaft both via the first selector shaft and via the second selector shaft. This makes it possible to arrange the transmission output shaft and the intermediate shaft on different sides of the motor vehicle transmission. A radial spacing between the intermediate shaft and the output shaft can be bridged by the selector shafts.

The invention is explained by way of example below by means of a preferred embodiment with reference to the attached drawings, wherein the features described below may represent one aspect of the invention either individually or in combination.

BRIEF DESCRIPTION OF THE DRAWINGS

FIG. 1 shows a schematic diagram of a drive train for a hybrid motor vehicle.

DETAILED DESCRIPTION

The drive train 10 shown in FIG. 1 for a hybrid motor vehicle has an internal combustion engine 12, which can be coupled to a motor vehicle transmission 16 by means of a transmission clutch 14 designed as a dual clutch. The transmission clutch 14 has a first component clutch C1 for coupling an engine shaft 18 of the internal combustion engine 12 to a first transmission input shaft 20 designed as a solid shaft, and a second component clutch C2 for coupling the engine shaft 18 to a second transmission input shaft designed as a hollow shaft. Within the motor vehicle transmission 16, the transmission input shafts 20, 22 mesh with a first selector shaft 24 for transmission gears 3, 4, 7 and 8 and with a second selector shaft 26 for transmission gears 1, 2, 5 and 6 via shiftable transmission stages. The second selector shaft 26 meshes via an output gearwheel Ko1 with an input gearwheel K of a transmission output shaft 28, which is coupled by a differential 29 to driven wheels (not shown) of the hybrid motor vehicle, in order to move the hybrid motor vehicle.

With the aid of an electric machine 30, the internal combustion engine 12 can be started. For this purpose, the engine shaft 18 of the internal combustion engine 12 has a belt pulley or a chain wheel 32, which is coupled to a planet carrier 36 of a planetary gearset 38 by a first belt drive or chain drive 34. The planet carrier 36 supports planet wheels 40, which mesh with a sun wheel 42 and an annulus 44. The sun wheel 42 is connected to an intermediate shaft 46, with the aid of which the electric machine is connected via a transmission gear 48 at an axial distance from the planetary gearset 38. The planetary gearset 38 has a first clutch K1, with the aid of which the annulus 44 can be held in a manner fixed relative to the housing, giving a transmission ratio that differs from 1.0 for cold-starting the internal combustion engine, for example, making it possible to modify the speed of the intermediate shaft 46 and to increase the corresponding torque on the engine shaft 18. With the aid of a second clutch K2, the annulus 44 can be connected for conjoint rotation to the intermediate shaft, resulting in a transmission ratio via the planetary gearset of 1.0 for warm-starting the internal combustion engine 12, for example, when the first clutch K1 is open.

Connected to the intermediate shaft 46 for conjoint rotation, in particular integrally, is a coaxial auxiliary shaft 50. With the aid of the auxiliary shaft 50, auxiliary units, in particular an air-conditioning compressor 54 of a motor vehicle air-conditioning system or a water pump 56, can be driven via a second belt drive 52 by means of the electric machine 30 when the internal combustion engine 12 is switched off. Also provided is an oil pump 58, which is connected to the engine shaft 18 in the embodiment shown and, alternatively, can be driven via the second belt drive 52.

For purely electric operation of the hybrid motor vehicle, a drive shaft 60 coaxial with the intermediate shaft 46 can be coupled for conjoint rotation to the intermediate shaft 46 with the aid of a third clutch K3. Via the drive shaft 60, the torque of the electric machine 30 can be introduced directly into the motor vehicle transmission 16, bypassing the transmission clutch 14 and the transmission input shafts 20, 22 and, in the case where both the first clutch K1 and the second clutch K2 are open, also bypassing the planetary gearset 38 and the engine shaft 18. For this purpose, the drive shaft 60 extending outside the motor vehicle transmission 16 can mesh with a driving gearwheel Ko2 of the first selector shaft 24. The torque introduced into the first selector shaft 24 is passed via a connection 62 to the transmission output shaft 28, which can be provided on the opposite side of the motor vehicle transmission 16 from the drive shaft 60 if the transmission output shaft 28 is arranged between the two selector shafts 24, 26.

For cold-starting the internal combustion engine 12, the first clutch K1 can be closed, while the second clutch K2 and the third clutch K3 are open, allowing a cold start with a high torque requirement to be performed by virtue of the additional transmission ratio of the planetary gearset 38 and, at the same time, allowing the auxiliary units 54, 56 to be driven. After the internal combustion engine 12 has been started, the electric machine 30 can be operated as a motor in this position of the clutches K1, K2, K3 in order to perform a boost and/or assist function by means of the additional power input, it being possible for an additional transmission ratio to be provided by the planetary gearset 38. The electric machine 30 can also be operated as a generator, allowing some of the power of the internal combustion engine 12 to be fed into the electric machine 30, e.g. to charge a motor vehicle battery, wherein an additional transmission ratio is provided by the planetary gearset 38. In this case, the auxiliary units 54, 56 are driven by the internal combustion engine 12 via the intermediate shaft 46 and the auxiliary shaft 50.

When the first clutch K1 and the third clutch K3 are open, while the second clutch K2 is closed, a transmission ratio of 1.0 is obtained in the planetary gearset 38, allowing the internal combustion engine 12 to be started while warm, in particular. After the internal combustion engine 12 has been started, the electric machine 30 can be operated as a motor in this position of the clutches K1, K2, K3 in order to perform a boost and/or assist function by means of the additional power input, with no additional transmission ratio being provided by the planetary gearset 38 in this case. The electric machine 30 can also be operated as a generator, allowing some of the power of the internal combustion engine 12 to be fed into the electric machine 30, with no additional transmission ratio being provided by the planetary gearset 38 in this case. In this case, the auxiliary units 54, 56 are driven by the internal combustion engine 12 via the intermediate shaft 46 and the auxiliary shaft 50.

For purely electric operation, the first clutch K1 and the second clutch K2 are open, while the third clutch K3 is closed. In purely electric operation, the internal combustion engine 12 is switched off and can be started in a simple manner during electric operation by closing the first clutch K1 or the second clutch K2. During this process, the third clutch K3 can remain closed until the internal combustion engine 12 has been started and/or the transmission clutch 14 is to be closed. When the first clutch K1, the second clutch K2 and the third clutch K3 are open, power flow from the electric machine 30 to the engine shaft 18 and to the motor vehicle transmission 16 is interrupted, allowing the auxiliary units 54, 56 to be driven by the electric machine 30, even when the internal combustion engine 12 is switched off.

Thus, the auxiliary units 54, 56 can be operated independently of the speed of the engine. At low speeds, the auxiliary units can thus turn more quickly and, at high speeds, more slowly than the engine. This can have positive ramifications for the design of the auxiliary units and/or the efficiency thereof. Moreover, a recovery mode is possible by passing the power flow from a wheel of the hybrid motor vehicle to the electric machine 30 via the transmission output shaft 28, bypassing the transmission 16.

The invention claimed is:

1. A drive train for a hybrid motor vehicle, comprising:
   an internal combustion engine that has an engine shaft for supplying a torque to drive the hybrid motor vehicle;
   an electric machine having an output shaft for supplying a torque to drive the hybrid motor vehicle, the output shaft being parallel to the engine shaft and the electric machine being substantially adjacent the internal combustion engine in directions transverse to rotational axes of the drive shaft and the output shaft;
   an intermediate shaft coupled to the electric machine via a speed-transforming gear having a transmission ratio differing from 1.0;
   a shiftable planetary gear set axially spaced from the electric machine and selectively connectable to the intermediate shaft and to the engine shaft to introduce torque of the electric machine into the planetary gearset at least at two different transmission ratios to start the internal combustion engine; and
   an auxiliary shaft coaxial with the intermediate shaft and rotatable conjointly with the intermediate shaft, the auxiliary shaft coupling the electric machine to at least one auxiliary unit, at least one of the auxiliary shaft and the intermediate shaft being between the internal combustion engine and the electric machine.

2. The drive train of claim 1, wherein the electric machine is positioned at an axial level of the internal combustion engine and spaced apart radially from the internal combustion engine.

3. The drive train claim 1, wherein the planetary gearset has a first clutch that can brake an annulus of the planetary gearset so that the annulus is fixed relative to a housing of the planetary gearset, and a second clutch that can couple the annulus of the planetary gearset for conjoint rotation to the intermediate shaft, and wherein the planetary gearset has a sun wheel connected for conjoint rotation to the intermediate shaft.

4. The drive train of claim 1, wherein the engine shaft can be coupled to a motor vehicle transmission via a transmission clutch to shift transmission gears, the motor vehicle transmission having first and second transmission input shafts for introducing a torque, one transmission output shaft for outputting a transformed torque, and first and second selector shafts for transmitting the torque from the respective first and second transmission input shafts to the transmission output shaft, and wherein the electric machine can be coupled to the first and second selector shafts, bypassing the transmission input shaft, to introduce a torque into the first and second selector shafts, or can be coupled to the transmission output shaft to introduce a torque into the transmission output shaft.

5. The drive train of claim 4, wherein the electric machine (30) can be coupled to the selector shaft (24, 26) or to the transmission output shaft (28) via a driving gearwheel.

6. The drive train of claim 4, wherein the torque that can be introduced into the motor vehicle transmission (16) by the electric machine (30) flows to the output shaft (28) both via the first selector shaft (24) and via the second selector shaft (26).

7. The drive train of claim 4, wherein the intermediate shaft is on a first radial side of the transmission and the transmission output shaft is on a second radial side of the transmission opposite the first radial side.

8. The drive train of claim 1, wherein the engine shaft can be coupled to a motor vehicle transmission via a transmission clutch to shift transmission gears, the motor vehicle transmission having at least one transmission input shaft for introducing a torque, one transmission output shaft for outputting a transformed torque, and at least one selector shaft for transmitting the torque from the transmission input shaft to the transmission output shaft, and wherein the electric machine can be coupled to the transmission output shaft to introduce a torque into the transmission output shaft.

9. A drive train for a hybrid motor vehicle, comprising:
an internal combustion engine that has an engine shaft for supplying a torque to drive the hybrid motor vehicle;
an electric machine having an output shaft for supplying a torque to drive the hybrid motor vehicle, the output shaft being parallel to the engine shaft and the electric machine being substantially adjacent the internal combustion engine in directions transverse to rotational axes of the drive shaft and the output shaft;
an intermediate shaft coupled to the electric machine via a speed-transforming gear having a transmission ratio differing from 1.0;
a shiftable planetary gear set axially spaced from the electric machine and selectively connectable to the intermediate shaft and to the engine shaft to introduce torque of the electric machine into the planetary gearset at least at two different transmission ratios to start the internal combustion engine; and
a motor vehicle transmission selectively coupled to the engine shaft via a transmission clutch to shift transmission gears, the motor vehicle transmission having first and second transmission input shafts for introducing a torque, one transmission output shaft for outputting a transformed torque, and first and second selector shafts for transmitting the torque from the respective first and second transmission input shafts to the transmission output shaft, and wherein the electric machine can be coupled to the first and second selector shafts, bypassing the transmission input shaft, to introduce a torque into the first and second selector shafts, or can be coupled to the transmission output shaft to introduce a torque into the transmission output shaft.

10. The drive train of claim 9, wherein the intermediate shaft is on a first radial side of the transmission and the transmission output shaft is on a second radial side of the transmission opposite the first radial side.

* * * * *